(12) United States Patent
Liu et al.

(10) Patent No.: US 9,383,829 B2
(45) Date of Patent: Jul. 5, 2016

(54) HAND-HELD COMBINATION KEY APPARATUS AND METHOD FOR INPUTTING INFORMATION BY HAND-HELD COMBINATION KEY APPARATUS

(76) Inventors: Benlin Liu, Changzhou (CN); Xiqing Liu, Changzhou (CN); Qiong Wang, Changzhou (CN); Zheng Wang, Changzhou (CN); Liming Zhao, Changzhou (CN); Bushan Liu, Changzhou (CN)

( * ) Notice: Subject to any disclaimer, the term of this patent is extended or adjusted under 35 U.S.C. 154(b) by 309 days.

(21) Appl. No.: 14/114,904

(22) PCT Filed: Apr. 30, 2011

(86) PCT No.: PCT/CN2011/073588
§ 371 (c)(1),
(2), (4) Date: Oct. 30, 2013

(87) PCT Pub. No.: WO2012/149671
PCT Pub. Date: Nov. 8, 2012

(65) Prior Publication Data
US 2014/0071056 A1  Mar. 13, 2014

(51) Int. Cl.
*G06F 3/023* (2006.01)
*G06F 1/16* (2006.01)
*G06F 3/0489* (2013.01)

(52) U.S. Cl.
CPC ............ *G06F 3/0233* (2013.01); *G06F 1/1626* (2013.01); *G06F 3/0235* (2013.01); *G06F 3/04892* (2013.01)

(58) Field of Classification Search
CPC . G06F 3/0233; G06F 3/0235; G06F 3/04892; G06F 1/1626
USPC .................................................. 345/156–179
See application file for complete search history.

(56) References Cited

U.S. PATENT DOCUMENTS

| | | | | |
|---|---|---|---|---|
| 6,885,317 B1* | 4/2005 | Gutowitz | ............... | G06F 3/0237 341/22 |
| 6,894,679 B2* | 5/2005 | Suzuki | ................... | G06F 3/0489 345/169 |
| 6,919,824 B2* | 7/2005 | Lee | ........................ | G06F 1/1616 341/20 |
| 7,020,270 B1* | 3/2006 | Ghassabian | ............ | G06F 1/1616 341/22 |
| 7,170,496 B2* | 1/2007 | Middleton | .............. | G04G 21/08 345/168 |
| 2003/0122784 A1* | 7/2003 | Shkolnikov | ............ | G06F 1/1626 345/169 |
| 2004/0046733 A1* | 3/2004 | Forlenza | ................ | G06F 3/0233 345/156 |
| 2007/0079239 A1* | 4/2007 | Ghassabian | ............. | G06F 3/014 715/707 |

(Continued)

*Primary Examiner* — Amare Mengistu
*Assistant Examiner* — Jennifer Zubajlo
(74) *Attorney, Agent, or Firm* — Anova Law Group, PLLC

(57) ABSTRACT

A hand-held combination key apparatus configured to input information to an intelligent electronic apparatus is provided. Three to five key groups, which correspond to each corresponding finger of a single hand respectively, are set on one of left side and right side of a shell, each key group having two combination keys, and each combination key being the key with compound functions of touch conduction and press conduction. Various combination states of touch conduction of each combination key are used to search and pre-display characters or operational function symbols; and press conduction of each combination key is used to determine character input or operational function input. The hand-held combination key apparatus can be used in any state without limitation absolutely, such as when the user is sitting, standing, lying down and moving, other than the normal standard keyboard which needs a practicable plane to support in use, saving space.

21 Claims, 11 Drawing Sheets

(56) References Cited

U.S. PATENT DOCUMENTS

2008/0141125 A1* 6/2008 Ghassabian ........... G06F 3/0237 715/261
2010/0302163 A1* 12/2010 Ghassabian ........... G06F 3/0237 345/168
2011/0141027 A1* 6/2011 Ghassabian ........... G06F 3/0237 345/168

* cited by examiner

HAND-HELD COMBINATION KEY APPARATUS AND METHOD FOR INPUTTING INFORMATION BY HAND-HELD COMBINATION KEY APPARATUS

FIELD OF THE INVENTION

The present invention generally relates to a hand-held combination key apparatus and method for inputting information by the hand-held combination key apparatus. The hand-held combination key apparatus may be an independent device, as well as an accessory of the corresponding intelligent electronic apparatuses.

BACKGROUND

Information is usually entered into a computer through a keyboard. Each key on the keyboard corresponds to a character or an operating function. A user may complete operations including inputting information and running programs simply through a conventional 88-key or 101-key keyboard. Therefore, keyboard inputting plays an important role in using computers and other intelligent electronic apparatuses.

Electronic information processing apparatuses such as computer and handheld mobile apparatuses such as mobile phones belong to the category of intelligent electronic apparatus. Common features of the intelligent electronic apparatus include: the intelligent electronic apparatus has a central processing unit and can automatically process a large number of data and information by using corresponding software. Especially with gradual popularization of the third generation mobile communication technologies, personal handheld apparatuses, based on powerful modern electronic technologies, are popularizing and developing to the complex requirement direction. There is an increasing market demand to improve data processing capabilities, including inputting, editing, and storage, of mobile phones and other handheld mobile apparatuses.

To make handheld mobile apparatuses including cell phones have a computer's (laptop or desktop computer) or similar to a computer's information processing capabilities, the bottleneck is not a cell phone or other handheld mobile apparatuses' internal storage and processing capabilities, but the handheld mobile apparatuses' obvious weaknesses and limitations on human-machine interface. Obviously, the computer is equipped with a large and flexible keyboard and an independent and high definition monitor. On the other hand, the handheld mobile apparatuses, due to its portability requirement, cannot be equipped with full-featured and relatively independent standard keyboard, mouse and monitor which are conveniently used for inputting information.

In order to improve the input function of the handheld information apparatuses, extensive and in-depth trials have been performed and many input methods of handheld mobile apparatuses have been developed. In some mobile phones, a mini-keyboard including 26 letters and 10 numbers is equipped at the bottom of the screen of the handheld mobile apparatuses through a clamshell or slider way, making the phone have more comprehensive data input capabilities. However, due to space restriction caused by portability, the keys of the mini-keyboard are usually small and are not as easy to use compared to a standard computer keyboard. Furthermore, the handheld mobile apparatuses are usually used in a handheld state. Then, the handheld mobile apparatuses with the mini-keyboard needs two hands to complete the operation of inputting information, one hand holding the handheld mobile apparatus, another hand pressing the mini-keyboard, which not only brings troublesome, but also leads to easily make mistakes, greatly reducing efficiency of information input.

Currently, another information input method of the handheld mobile apparatuses is to input information through the use of the keyboard in conjunction with screen display (i.e. a touch screen). Information is entered using the keyboard displayed on the display screen. But this kind of information input method may affect screen display. Chinese patent documentation CN1493966A (application No. 03158555.8) disclosed method and apparatus for keyboard entry using a handheld input apparatus, which records:

"Handheld input apparatus 500 contains a thumb control push pad, such as push pad 510. Push pad 510 is capable of multiple selections. In the preferred embodiment of the present invention, push pad 510 has nine possible selections, which consist of the eight directional positions (North, North East, East, South East, South, South West, West, and North West) and the center position. Any one of the nine positions may be selected. Handheld input apparatus 500 also contains buttons 521, 523, 525, and 527. The four fingers control the four buttons, such as buttons 521, 523, 525, and 527. For example, since handheld input apparatus 500 is held in the palm of the right hand, the index finger operates button 527, the middle finger operates button 525, the ring finger operates button 523, and the pinky finger operates button 521."

"The four buttons on the handheld input apparatus, such as handheld input apparatus 500 and 550, can be pressed in various combinations to generate up to sixteen different possible keystrokes. When pressing combinations of the four buttons in conjunction with the thumb controlled push pad, the handheld input apparatus is capable of deriving at least 144 unique keystrokes. The keystrokes generate a signal representing an alphanumeric character, function, or specialized character. The signal is sent to a computer apparatus, such as client 100 in FIG. 1, client 200 in FIG. 2, PDA 300 in FIG. 3, and PDA 400 in FIG. 4. Handheld input apparatus 500 and 550 may be physically attached to a computer apparatus using an adapter, such as handheld input apparatus adapter 416 in FIG. 4, or the signal may be sent to the computer apparatus using wireless technology."

"A corresponding apparatus driver on a computer apparatus receives the incoming signals via some connection methods such as serial port, USB, Bluetooth or some other transport mechanism. The apparatus driver maps the signal to the corresponding keystroke and forwards the information to the operating system."

"Configuration software is used to setup the mappings of the keystrokes. For example, when the combination of keystrokes is pressed, a GUI program representing the four finger buttons and the nine thumb positions as radio buttons may be utilized to input the desired fingering position with an entry field to input the character desired. The input is used to generate the mappings that the apparatus driver uses to translate the incoming signals to actual keystrokes. The keyboard input is completely programmable to meet the needs of the application being supported. Additionally, the mapping of the keystrokes may be displayed on a computer apparatus."

It can be seen from the above descriptions, when pressing combinations of the four buttons in conjunction with the thumb controlled push pad, the handheld input apparatus is capable of deriving at least 144 unique keystrokes. Therefore, when a user wants to proficiently input characters by using the handheld input apparatus as a keyboard, the user has to remember the 144 keystrokes. But it is not very easy to remember the 144 keystrokes. Further, when the combination of keystrokes is pressed, the mappings of the keystrokes may be displayed on a computer apparatus. If wrong characters are inputted, the user has to delete the wrong characters and input correct characters again. Thus, when inputting information, the input operation may be repeated for multiple times, greatly affecting the efficiency of inputting information.

BRIEF SUMMARY OF THE DISCLOSURE

The purpose of the invention is that, when a user needs to inputs information, a set of characters can be pre-displayed; after the user confirms the input, the information can be inputted to a corresponding intelligent electronic apparatus by a hand-held combination key apparatus and a method for inputting information by the hand-held combination key apparatus.

Basic technical solutions for achieving the purpose of this invention include the followings. A hand-held combination key apparatus, also called the apparatus, including a shell, configured to input information to an intelligent electronic apparatus. Three to five key groups, which correspond to each corresponding finger of a single hand respectively, are set on one of left side and right side of the shell, each key group having two combination keys, and each combination key being the key with compound functions of touch conduction and press conduction. Various combination states of touch conduction of each combination key are used to search and pre-display characters or operational function symbols. Press conduction of each combination key is used to determine character input or operational function input.

Further, the apparatus is held and operated in a right hand. The apparatus also includes a touch key and circuit device. The shell is designed to a shape that can be held conveniently by a hand or the same shape as the hand held mobile apparatuses based on human engineering and operating requirements. The apparatus is held by the thumb and the index finger. The shell is formed by fixedly connecting a front cover with a back cover. Various key groups are placed on the left side of the shell. A holding portion which protrudes to the right side and can conduct electricity is set on the upper right side of the shell.

The circuit device includes a printed-circuit board, a microcontroller set on the printed-circuit board, a retrieval sampling circuit, a control circuit and a DC power supply. The circuit device is set inside the shell and fixedly connected to the shell. The circuit device has seven retrieval sampling circuits and three number of control circuits. Various retrieval sampling circuits of the circuit device have same circuit structure, which are a capacitive detection circuit or a resistance-type detection circuit. When the retrieval sampling circuit is a resistive-type detection circuit, the retrieval sampling circuit uses the inverter or op-amp as a main circuit. One of positive and negative poles of power supply of the printed-circuit board is used as a ground and is connected to the held portion. Output ports of various retrieval sampling circuits are connected to one I/O port of the microcontroller.

A touch key is fixed on the shell. The touch key includes a conductive touch keycap. The touch keycap is electrically connected to a control port of a corresponding retrieval sampling circuit and is located at held position by an index finger. Three groups of combination keys are a first key group, a second key group and a third key group according to a top-to-bottom order. The first key group includes a first combination key and a second combination key arranged in order. The second key group includes a third combination key and a fourth combination key arranged in order. The third key group includes a fifth combination key and a sixth combination key arranged in order.

Six number of combination keys of the three combination key groups have the same structure. Each combination key includes a conductive keycap, an elastic insulator and a movable stationary contact component. The keycap is electrically connected to a control port of a corresponding retrieval sampling circuit. The elastic insulator is set between the keycap and a movable contact of the movable stationary contact component, and insulates the keycap and the movable contact. The movable contact and the stationary contact of the movable stationary contact component forms circuit of a push button.

Each control circuit of the circuit device has the same circuit structure. Each key group corresponds to one control circuit. Each control circuit is one OR gate constituted by push buttons of two combination keys of the same key group together. Two inputs of the OR gate are electrically connected to a ground of the power supply of the circuit device. An output of the OR gate connects to one corresponding I/O port of the microcontroller. Pressing the keycap makes the movable contact and the stationary contact of the combination key contact, turning on a corresponding push button and an OR gate of the corresponding control circuit, thus outputting a low level to the microcontroller as a confirmation signal.

When the apparatus inputs information to the intelligent electronic apparatus, the microcontroller of this apparatus creates a bidirectional connection to the intelligent electronic apparatus's main chip through a wireless way, a wired way, or a direct connection way. The corresponding opened or closed pre-display floating window is set in a display screen of the intelligent electronic apparatus.

Further, the front cover and the rear cover are insulation injection molding, and the front cover is an injection molding with a conductive frustum-shaped insert. The front cover is formed by a front frame plate and 4 side plates, including an upper side plate, a left side plate, a lower side plate and a right-side plate, where the 4 side plates are connected to the front frame plate and the 4 number of side plates are also connected to each other in turn. The conductive frustum-shaped insert as the held portion of the shell locates on the top of the right-side plate of the front cover and protrudes to the right. A through-hole of the touch keycap is set on the upper part of the left side plate of the front cover, opposing to the location of the held portion. From the top to bottom, 3 groups of keyholes are set in the middle part of the left side plate of the front cover, known as the first group keyhole, the second group keyhole and the third group keyhole, respectively. Each group has two keyholes set up in the order of front and rear, and the shape of each keyhole is rectangular. In the keyholes of each group, the keyhole at the rear side is slightly higher than the keyhole at the front side. Each keycap is small-left and right-large bevel shape. Each combination key exposes to the left of the shell from a corresponding keyhole of the front cover of the shell by each keycap.

A touch key also includes an insulation mounting base and a lead. The touch keycap of the touch key is a frustum-shaped projection. The insulation mounting base is set to the upper part of the left side plate of the front cover of the shell. The touch keycap is fixed on the insulation mounting base. The insulation mounting base is fixed to the inner wall of the front cover of the shell. One end of the lead is fixed by welding on the touch keycap, and the other end of the lead is electrically connected to a control port of a corresponding retrieval sampling circuit. The touch keycap passes through the shell from the circular touch keycap through-hole located on the upper part of the left side plate of the front cover and protrudes to the left side.

The keycap component of each combination key also includes a lead, an elastic insulator and a movable stationary contact component. One end of the lead is fixedly welded at the keycap. The other end of the lead is electrically connected to a control port of a corresponding retrieval sampling circuit. The keycap of each combination key, the elastic insulator, and a movable contact are arranged from left to right. The movable contact is a conductive plate. The stationary contact as a copper insert is fixed on the first electrode and the second electrode of the insulation mounting base. The conductive plate as the movable contact along with the first electrode and the second electrode as the stationary contact form a corresponding push button. The insulation mounting base is fixed on the front cover of the shell. A compression spring as an elastic strutting piece is set between plate and the left side of the inner cavity of the insulation mounting base.

Each combination key exposes to the left of the shell 1 from the front cover of the shell by each keycap. The position of the second combination key is slightly higher than the position of the corresponding first combination key. The position of the fourth combination key is slightly higher than the position of the corresponding third combination key. The position of the sixth combination key is slightly higher than the position of the corresponding fifth combination key. The convex portion of the second combination key is smaller than the convex portion of the first combination key. The convex portion of the fourth combination key is smaller than the convex portion of the third combination key. The convex portion of the sixth combination key is smaller than the convex portion of the fifth combination key.

The apparatus is held and operated in a right hand. The apparatus further includes a circuit device and a resilient mounting sleeve. The shell is designed to a shape that can be held conveniently by a hand or the same shape as the hand held mobile apparatuses based on human engineering and operating requirements. The resilient mounting sleeve set one the shell is configured to hold the apparatus on the palm. When the apparatus is held on the palm, the portion of the shell contact with palm root is the held portion, and the held portion is a conductive portion.

The shell is formed by fixedly connecting a front cover with a back cover. 5 key groups are placed on the shell, where 4 key groups are placed on the left side of the shell and 1 key group is placed on the right upper part of the shell.

The circuit device includes a printed-circuit board, a microcontroller set on the printed-circuit board, a retrieval sampling circuit, a control circuit and a DC power supply. The circuit device is set inside the shell and fixedly connected together by the shell. The circuit device has 10 retrieval sampling circuits and 5 number of control circuits. Various retrieval sampling circuits of the circuit device have the same circuit structure, which are a capacitive detection circuit or a resistance-type detection circuit. When the retrieval sampling circuit is a resistive-type detection circuit, the retrieval sampling circuit uses the inverter or op-amp as a main circuit. One of positive and negative poles of power supply of the printed-circuit board is used as a ground and is connected to the held portion. Output ports of various retrieval sampling circuits are connected to one I/O port of the microcontroller.

The 4 key groups located at the left side of the shell in accordance with the order from top to bottom are the first key group, the second key group, the third key group and the fourth key group, respectively. The 4 number of key groups correspond to the index finger, the middle finger, the ring finger and the pinky finger, respectively when the 4 number of key groups are used. The first key group includes a first combination key and a second combination key sequentially arranged in order. The second key group 4 includes a third combination key and a fourth combination key sequentially arranged in order. The third key group includes a fifth combination key and a sixth combination key sequentially arranged in order. The fourth key group includes a seventh combination key and an eighth combination key combination key sequentially arranged in order. The key group located in the upper right side of the shell is the fifth key group. The fifth key group corresponds to the thumb. The fifth key group includes a ninth combination key and an tenth combination key combination key sequentially arranged in order.

The 10 combination keys of the five combination key groups have the same structure. Each combination key includes a conductive keycap, an elastic insulator and a movable stationary contact component. The keycap is electrically connected to a control port of a corresponding retrieval sampling circuit. The elastic insulator is set between the keycap and a movable contact of the movable stationary contact component, and insulates the keycap and the movable contact. The movable contact and the stationary contact of the movable stationary contact component forms circuit of a push button.

Each control circuit of the circuit device has the same circuit structure. Each key group corresponds to one control circuit. Each control circuit is one OR gate constituted by push buttons of two combination keys of the same key group together. Two inputs of the OR gate are electrically connected to a ground of the power supply of the circuit device. An output of the OR gate connects to one corresponding I/O port of the microcontroller. Pressing the keycap makes the movable contact and the stationary contact of the combination key contact, turning on a corresponding push button and an OR gate of the corresponding control circuit, thus outputting a low level to the microcontroller as a confirmation signal.

When the apparatus inputs information to the intelligent electronic apparatus, the microcontroller of this apparatus creates a bidirectional connection to the intelligent electronic apparatus's main chip through a wireless way, a wired way, or a direct connection way. The corresponding opened or closed pre-display floating window is set in a display screen of the intelligent electronic apparatus.

The apparatus includes further includes a touchpad. The touchpad is set on the rear cover of the shell. The rear cover is a cover that has open touchpad hole at the top left. The touch side of the touchpad is exposed outwardly from the left upper side of the rear cover of the shell.

A method for the hand-held combination key to input information includes the following steps.

Step 1: when a user operates the apparatus, the index finger holds the touch key to conduct the corresponding retrieval sampling circuit. The middle finger touches on two combination keys of the first key group. The ring finger touches on two combination keys of the second key group. The pinky finger touches on two combination keys of the third key group. When a finger touches the corresponding combination key, the retrieval sampling circuit that is electrically connected to the keycap of the combination key is in the corresponding conducting state. The retrieval sampling circuit that is electrically connected to the untouched combination key is in the corresponding cut-off state.

Step 2: the microcontroller sets the state of the combination key which is connected to the conducting retrieval sampling circuit to "1" state, while the microcontroller sets the state of the untouched combination key which is connected to the cut-off retrieval sampling circuit to "0" state. Based on the different states of various combination keys, the microcontroller identifies a corresponding set of three characters through a look-up table approach. The microcontroller of this apparatus creates a bidirectional connection to the intelligent electronic apparatus's main chip. The three characters are pre-displayed on a pre-displayed floating window of the display device of the intelligent electronic device by the main chip.

Step 3: when a user needs to confirm one displayed corresponding character, the user only needs to press the corresponding key group which corresponds to the pre-displayed window. The microcontroller passes the confirmation information to the main chip of the intelligent electronic apparatus. The main chip confirms character input. The character is entered into the corresponding intelligent electronic apparatus.

The apparatus includes further includes a touchpad. The touchpad is set on the rear cover of the shell. After the index finger leaves the touch key, the apparatus exits the character retrieval and input state. At this time, the apparatus is in an information processing and control operation state. The first combination key and the second combination key touched by the middle finger can be changed to the held key of the apparatus. When the apparatus is held by the middle finger, the thumb and the thumb metacarpal, the second key group 4 and the third key group 5 can be changed into a left keystroke and a right keystroke, which are similar to the left button and the right button of the mouse, respectively. When the index finger moves on the touchpad, the movement of a cursor of the corresponding intelligent electronic apparatus can be implemented.

BRIEF DESCRIPTION OF THE DRAWINGS

FIG. 4-1 is a schematic of the front side of the hand-held combination key apparatus shown in FIG. 1; FIG. 4-2 is a left view of the hand-held combination key apparatus shown in FIG. 1; FIG. 4-3 is a right view of the hand-held combination key apparatus shown in FIG. 1; and FIG. 4-4 is a rear view of the hand-held combination key apparatus shown in FIG. 1;

FIG. 8-1 shows a small display area located at the left side of the liquid crystal display; FIG. 8-2 shows a small display area located at the upper side of the liquid crystal display; and FIG. 8-3 shows a small display area located at the lower side of the liquid crystal display;

FIG. 10-1 is a front view; and FIG. 10-2 is a top view of FIG. 10-1.

Figure 1:
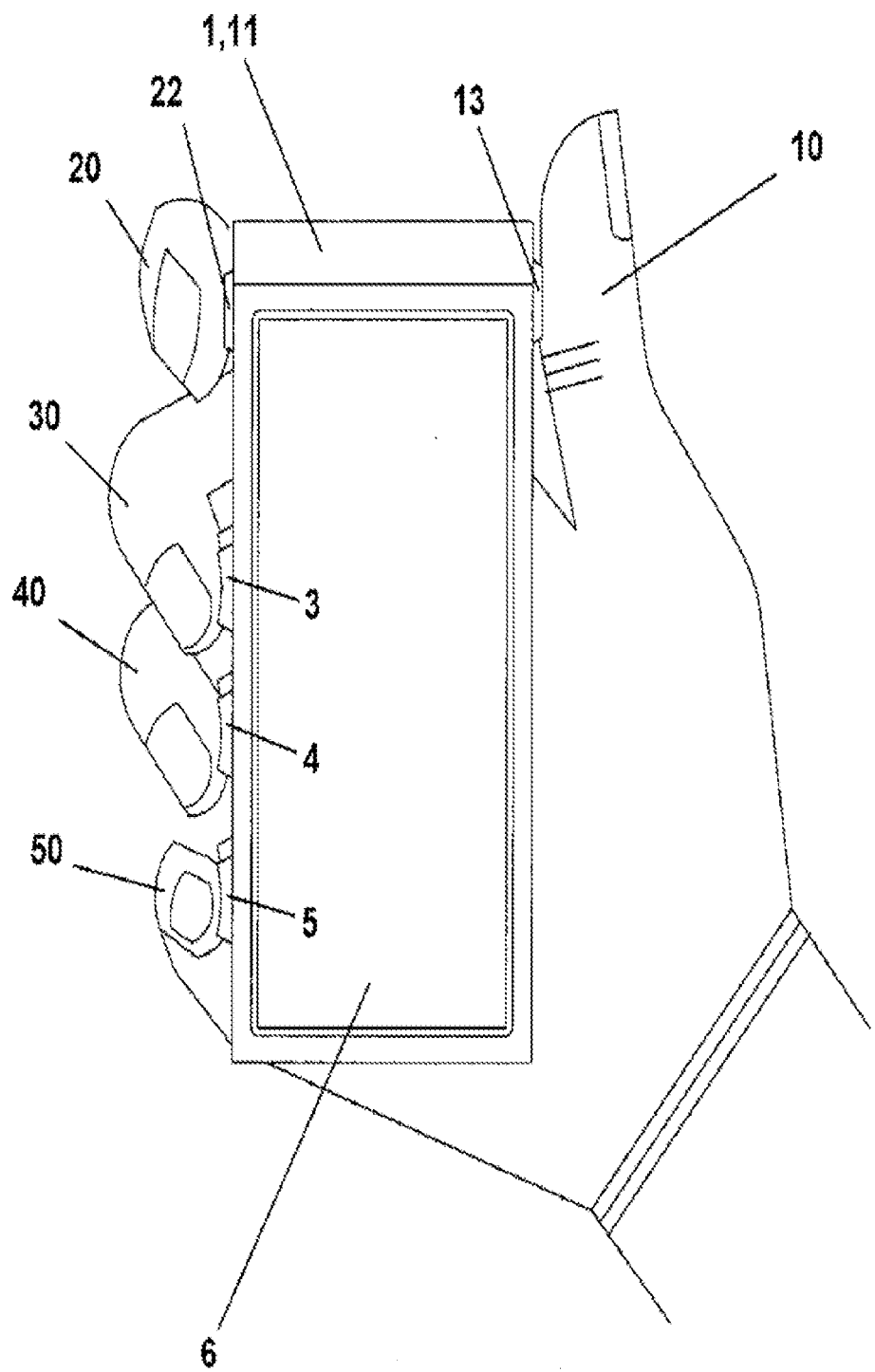
FIG. 1 illustrates a structure diagram of an exemplary hand-held combination key apparatus consistent with the disclosed embodiments, where the hand-held combination key apparatus is held by a hand.

The above drawings are labeled as follows:

shell 1, front cover 11, rear cover 12, held portion 13, touchpad 21, touch key 22, touch keycap 22-1, insulation mounting base 22-2, lead 22-3, first key group 3, first combination key 31, keycap 31-1, lead 31-2, elastic insulator 31-3, plate 31-4, first electrode 31-5, second electrode 31-6, elastic strutting piece 31-7, insulation mounting base 31-8, second combination key 32, second key group 4, third combination key 41, fourth combination key 42, third key group 5, fifth combination key 51, sixth combination key 52, liquid crystal display 6, first small display area 63, second small display area 64, third small display area 65, circuit device 7, microcontroller 71, retrieval sampling circuit 72, control circuit 73, DC power supply 74, thumb 10, index finger 20, middle finger 30, ring finger 40, and pinky finger 50.

DETAILED DESCRIPTION

Embodiment One

Descriptive directions of the embodiment are described according to the directions shown in FIG. 1. Up, down, left and right directions shown in FIG. 1 are the same as up, down, left and right directions described in this embodiment.

Figure 4:
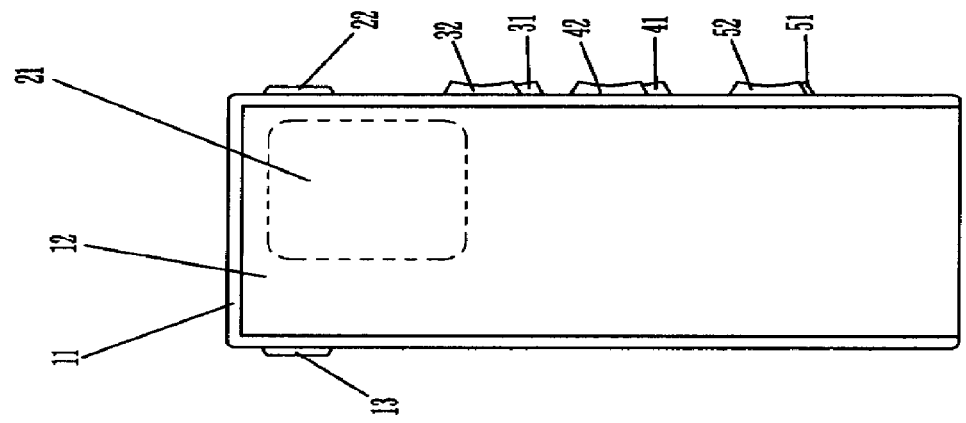
FIG. 4 illustrates a schematic diagram of combination key set at the side of the hand-held combination key apparatus shown in FIG. 1, where
Figures 3, 4:
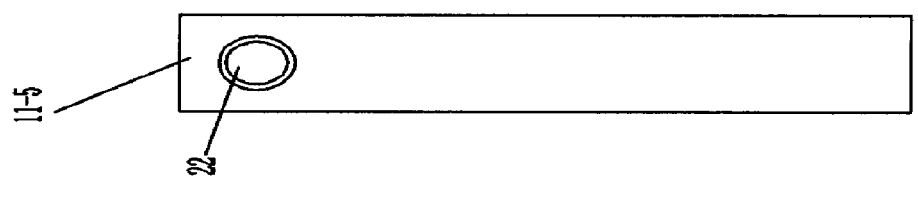
Figures 2, 4:
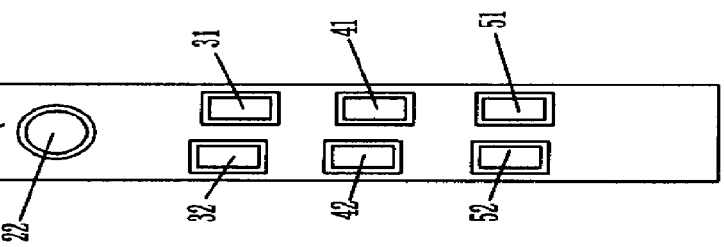
Figures 1, 4:
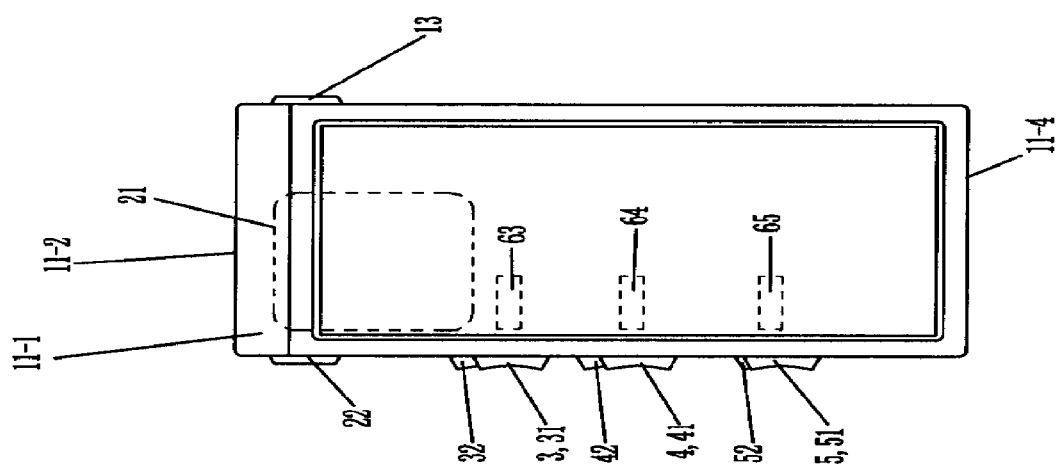
Figure 6:
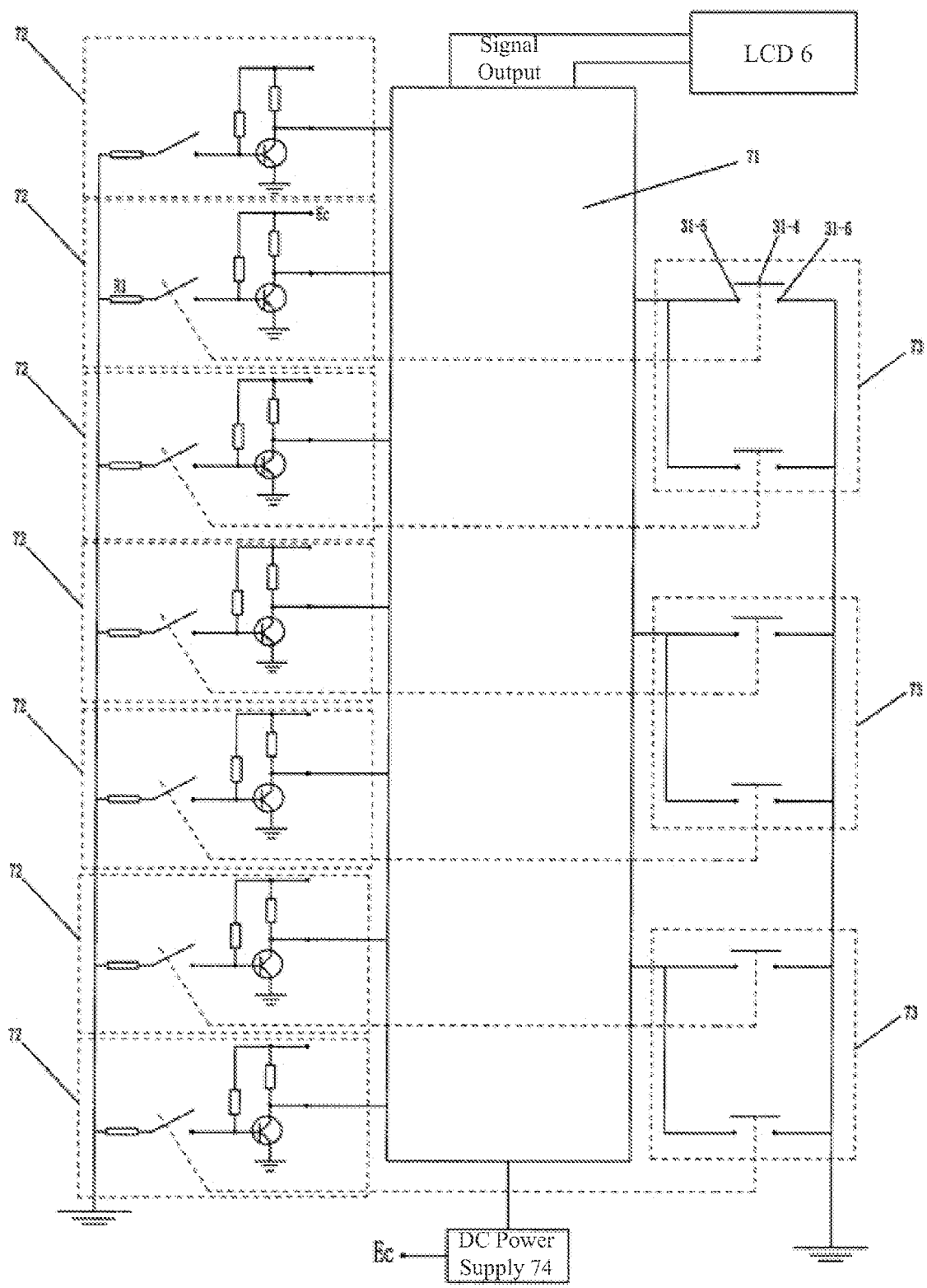
FIG. 6 illustrates a circuit schematic diagram of a circuit device of a hand-held combination key apparatus shown in FIG. 1.

As shown in FIG. 1, FIG. 4 and FIG. 6, hand-held combination key apparatus described in the present embodiment (hereinafter referred to as the apparatus) includes a shell 1, a touchpad 21, a touch key 22, 3 groups of combination keys, a liquid crystal display (LCR) 6 and a circuit device 7. The circuit device 7 includes a printed-circuit board, a microcontroller 71 set on the printed-circuit board (the microcontroller is ATmega48 model made in ATMEL), a retrieval sampling circuit 72, a control circuit 73 and a DC power supply 74. The touchpad 21, the liquid crystal display 6 and the circuit device 7 are set inside the shell 1 and fixedly connected together by the shell 1. The screen of the liquid crystal display 6 is exposed outwardly from the front side of the shell 1. The liquid crystal display 6 and the corresponding circuit device 7 are electrically connected. The touch side of the touchpad 21 is exposed outwardly from the left upper side of the rear side of the shell 1. The circuit device 7 has seven retrieval sampling circuits 72 and three control circuits 73.

As shown in FIG. 4, the shell 1 is designed to a shape that can be held easily by a hand or the same shape as the hand held mobile apparatuses based on human engineering and operating requirements, such as a rectangular shell, a cylindrical shell, an olive shell, etc. In this embodiment, the shell is a rectangular shell.

As shown in FIG. 1 and FIG. 4, the front cover 11 and the rear cover 12 which are fixedly connected together constitute the shell (specific structure is fixedly connected by mutual snap connection, a plug screw and a bolt disposed on the front cover 11, or plugging and then snapping to each other, etc.). The front cover 11 and the rear cover 12 are insulation injection molding, and the front cover 11 is an injection molding with a conductive frustum-shaped insert. The front cover 11 is formed by a front frame plate 11-1 and 4 number of side plates (an upper side plate 11-2, a left side plate 11-3, a lower side plate 11-4 and a right-side plate 11-5), where the 4 side plates are connected to the front frame plate 11-1 and the 4 number of side plates are also connected to each other in turn. The conductive frustum-shaped insert as the held portion 13 of the shell 1 locates on the top of the right-side plate 11-5 of the front cover 11 and protrudes to the right. A circular through-hole is set on the upper part of the left side plate 11-3 of the front cover 11, opposing to the location of the held portion 13. From the top to bottom, 3 groups of keyholes are set in the middle part of the left side plate 11-3 of the front cover 11, known as the first group keyhole, the second group keyhole and the third group keyhole, respectively. Each group has two keyholes set up in the order of front and rear, and the shape of each keyhole is rectangular. In the keyholes of each group, the keyhole at the rear side is slightly higher than the keyhole at the front side.

In this embodiment, the rear cover 12 is a cover that has open touchpad hole at the top left. The front cover 11 and the rear cover 12 have a mutually plug portion and a mutually connected buckle portion, so that the two portions are fixedly connected by plugging in and then snapping to each other.

Figure 2:
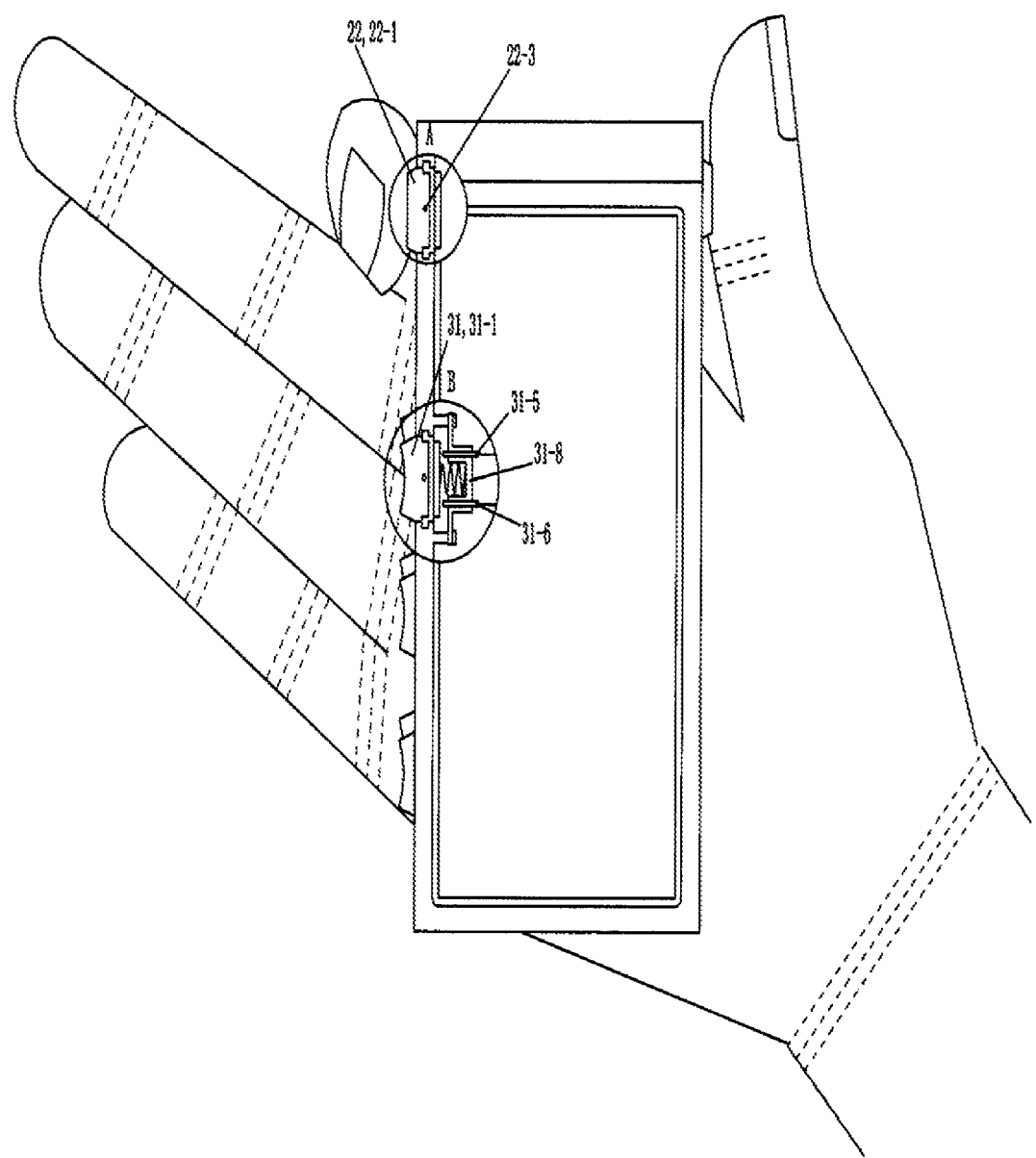
FIG. 2 illustrates a schematic diagram of an index finger and a thumb of a hand holding a hand-held combination key apparatus shown in FIG. 1.
Figure 3:
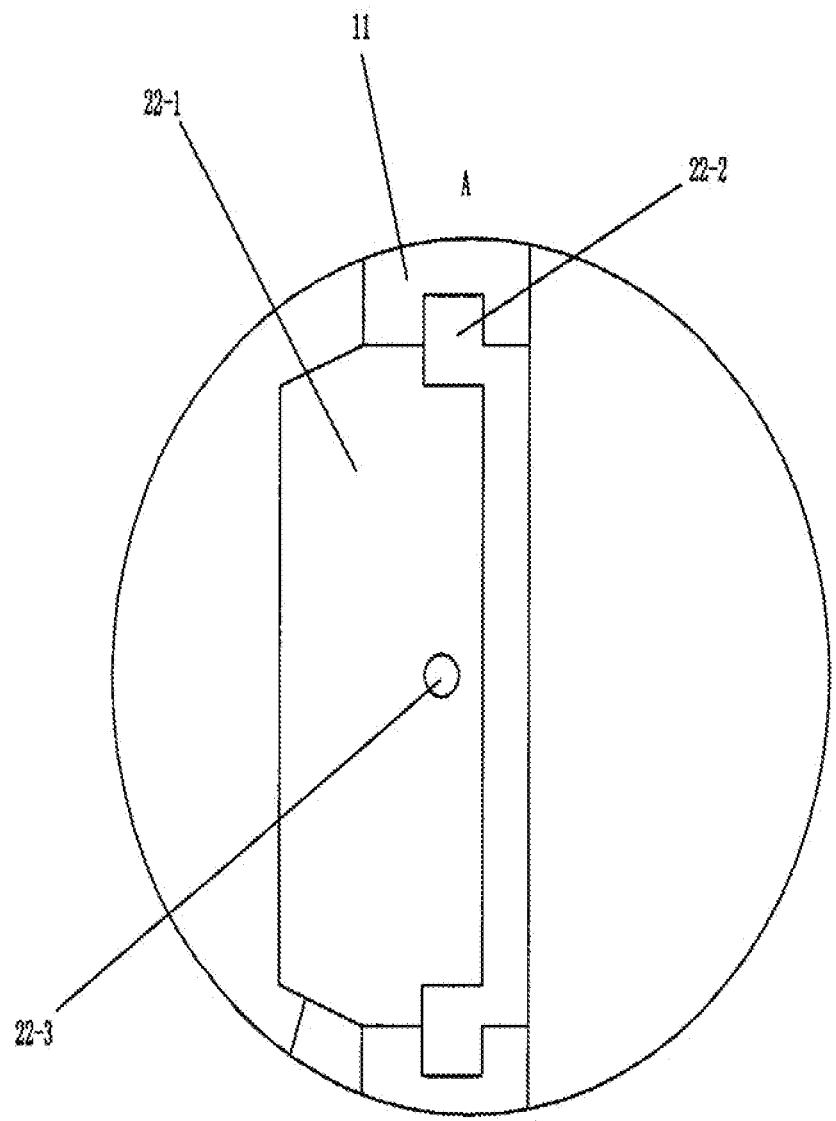
FIG. 3 illustrates an enlarged schematic diagram of cross-sectional structure at A in FIG. 2.

As shown in FIG. 2 and FIG. 3, a touch key 22 includes a touch keycap 22-1, an insulation mounting base 22-2 and a lead 22-3. The touch keycap 22-1 is made of a conductive material, and the touch keycap 22-1 is a frustum-shaped projection. The touch keycap 22-1 is fixed on the insulation mounting base 22-2. The insulation mounting base 22-2 is fixed to the inner wall of the front cover 11 of the shell 1. The touch keycap 22-1 passes through the circular through-hole located on the upper part of the left side plate 11-3 of the front cover 11 and protrudes to the left. One end of the lead 22-3 is fixed by welding on the touch keycap 22-1, and the other end of the lead 22-3 is electrically connected to a control port of a corresponding retrieval sampling circuit 72.

As shown in FIGS. 1 and 2, this apparatus is suitable for use with a single hand held. With a thumb 10 pressing on the held portion 13 of the shell 1, an index finger 20 pressing on the touch key 22, as well as with the palm forcing uplift at the rear and lower part of the shell 1, the apparatus can be firmly clenched in a user's hand.

As shown in FIG. 4, three groups of combination keys include a first key group 3, a second key group 4 and a third key group 5. The first key group 3 includes a first combination key 31 and a second combination key 32 arranged in order. The second key group 4 includes a third combination key 41 and a fourth combination key 42 arranged in order. The third key group 5 includes a fifth combination key 51 and a sixth combination key 52 arranged in order. Each combination key exposes to the left of the shell 1 from a corresponding keyhole of the front cover 11 of the shell 1 by the respective keycap 31-1. The first combination key 31 corresponds to the keyhole at the front side of the first group keyhole of the shell 1. The second combination key 32 corresponds to the keyhole at the rear side of the first group keyhole of the shell 1. The third combination key 41 corresponds to the keyhole at the front side of the second group keyhole of the shell 1. The fourth combination key 42 corresponds to the keyhole at the rear side of the second group keyhole of the shell 1. The fifth combination key 51 corresponds to the keyhole at the front side of the third group keyhole of the shell 1. The sixth combination key 52 corresponds to the keyhole at the rear side of the third group keyhole of the shell 1. Thus, the position of the second combination key 32 is slightly higher than the position of the corresponding first combination key 31. The position of the fourth combination key 42 is slightly higher than the position of the corresponding third combination key 41. The position of the sixth combination key 52 is slightly higher than the position of the corresponding fifth combination key 51. In addition, the convex portion of the second combination key 32 is smaller than the convex portion of the first combination key 31. The convex portion of the fourth combination key 42 is smaller than the convex portion of the third combination key 41. The convex portion of the sixth combination key 52 is smaller than the convex portion of the fifth combination key 51.

Figure 5:
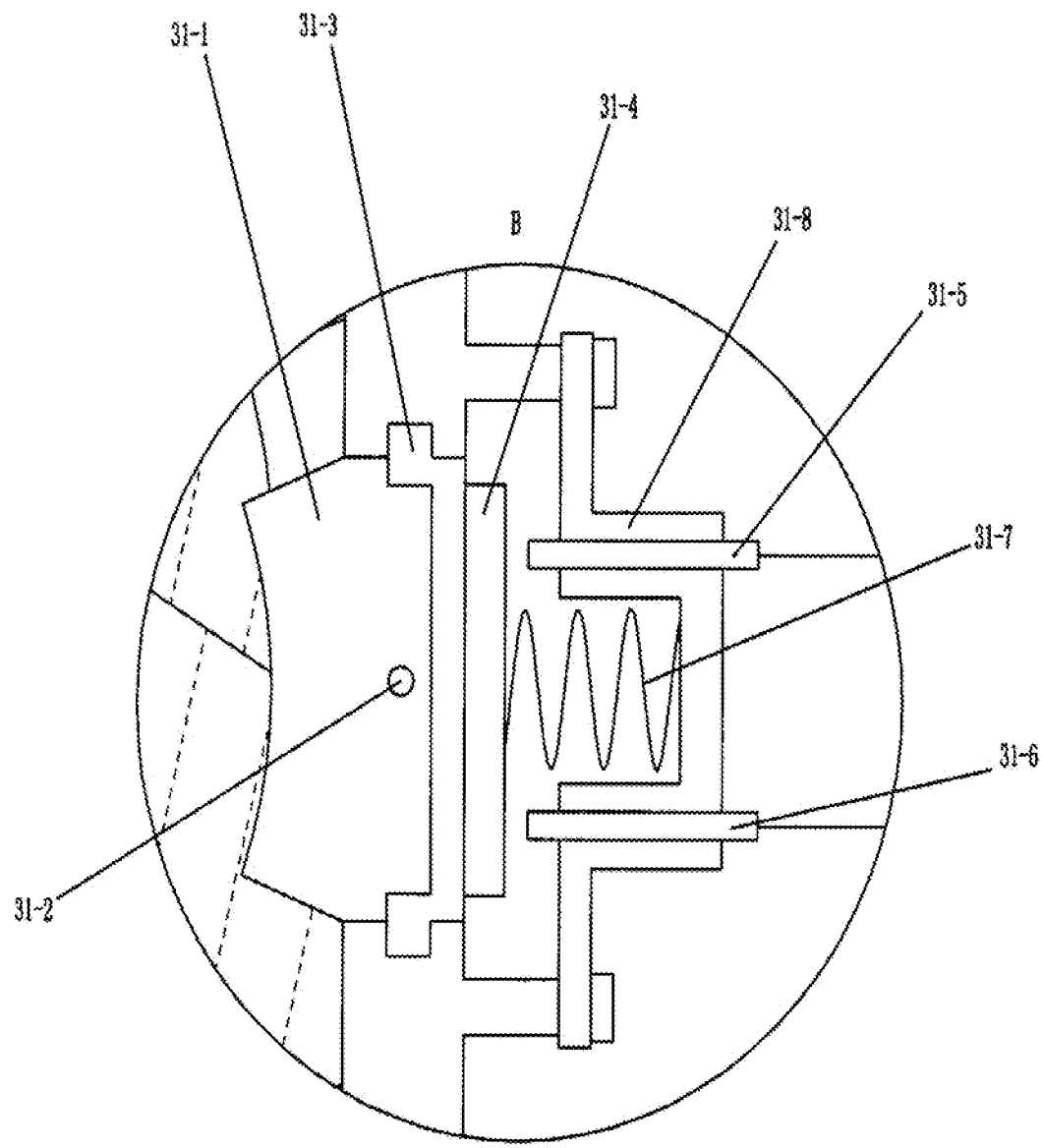
FIG. 5 illustrates an enlarged schematic diagram of cross-sectional structure at B in FIG. 2.

As shown in FIG. 5 and FIG. 6, six number of combination keys 31, 32, 41, 42, 51, 52 of the three combination key groups have the same structure. The combination keys are keys that have compound functions including touch conduction and press conduction. The combination of signals generated from touch conduction of various combination keys can be used for characters retrieval and pre-displaying. Pressing conduction function of each combination key is used for character input confirmation. Each combination key includes a conductive keycap 31-1, a lead 31-2, an elastic insulator 31-3 and a movable stationary contact component. Each keycap 31-1 is small-left and right-large bevel shape. The keycap 31-1 is made of the copper material. One end of the lead 31-2 is fixedly welded at the keycap 31-1. The other end of the lead 31-2 is electrically connected to a control port of a corresponding retrieval sampling circuit 72. The elastic insulator 31-3 is set between the keycap 31-1 and the movable contact of the movable stationary contact component, and insulates the keycap 31-1 and the movable contact component. The movable contact is a conductive plate 31-4. The stationary contact as a copper insert is fixed on the first electrode 31-5 and the second electrode 31-6 of the insulation mounting base 31-8. The first electrode 31-5 and the second electrode 31-6 are made of copper material. The conductive plate 31-4 as the movable contact along with the first electrode 31-5 and the second electrode 31-6 as the stationary contact form a corresponding push button. Thus, the movable contact and the stationary contact of the movable stationary contact component forms circuit of a push button.

The keycap 31-1, the elastic insulator 31-3 and the plate 31-4 are arranged in accordance with the order from left to right. The insulation mounting base 31-8 is fixed on the front cover 11 of the shell 1. An elastic strutting piece 31-7 is set between plate 31-4 and the left side of the inner cavity of the insulation mounting base 31-8. The elastic strutting piece 31-7 is a compression spring.

Each retrieval sampling circuit 72 has the same circuit structure. Capacitive detection circuit or resistance-type detection circuit can be used as the retrieval sampling circuit. A resistive detection circuit is used in the embodiment. The retrieval sampling circuit 72 uses the inverter or op-amp as main circuit (the inverter is used in the embodiment). The inverter is the common-emitter amplifier circuit including a transistor, a base resistance and a collector resistor. The other end of the collector resistor is a power supply of the retrieval sampling circuit 72 and is electrically connected to an output port of the DC power supply 74. The collector of the transistor is an output port of retrieval sampling circuit 72 and is connected one I/O port of a microcontroller 71. The base of the transistor is a control port of the retrieval sampling circuit 72. The conductive frustum-shaped insert of the held portion 13 of the shell 1 of the apparatus and a negative pole of the insert printed-circuit board is electrically connected through the wire. Thus, the held portion 13 is a ground. When the keycap 31-1 does not be connected, the lead 31-2 remains unchanged a high level. After the high level is inverted by the inverter of the retrieval sampling circuit 72, the output of the retrieval sampling circuit 72 outputs a low level. If the finger touches the keycap 31-1, the low level of the held portion 13 of the shell 1 is conducted to the keycap 31-1 by a hand (resistance of the hand is R1). Then the low level is transmitted to the control port of the retrieval sampling circuit 72 through the lead 31-2. An output of the retrieval sampling circuit 72 outputs the high level. Thus, in the present embodiment, various retrieval sampling circuits 72 and the keycap 31-1, the hand and the held portion 13 of the shell 1 together constitute a resistive type touch retrieval sampling circuit. The circuit device 7 has three number of the control circuits 73. Each key group corresponds to one control circuit 73. Each control circuit 73 is one OR gate constituted by push buttons of two combination keys of the same key group together. The two inputs of the OR gate are grounded. An output of the OR gate connects to one corresponding I/O port of the microcontroller 71. Pressing the keycap 31-1 makes the plate 31-4 (i.e. to the right) to move inwardly, contacting with the first electrode 31-5 and the second electrode 31-6. Thus, a corresponding push button is turned on, and an OR gate of the corresponding control circuit 73 is turned on, thus outputting a low level to microcontroller 71 as a confirmation signal.

Figure 7:
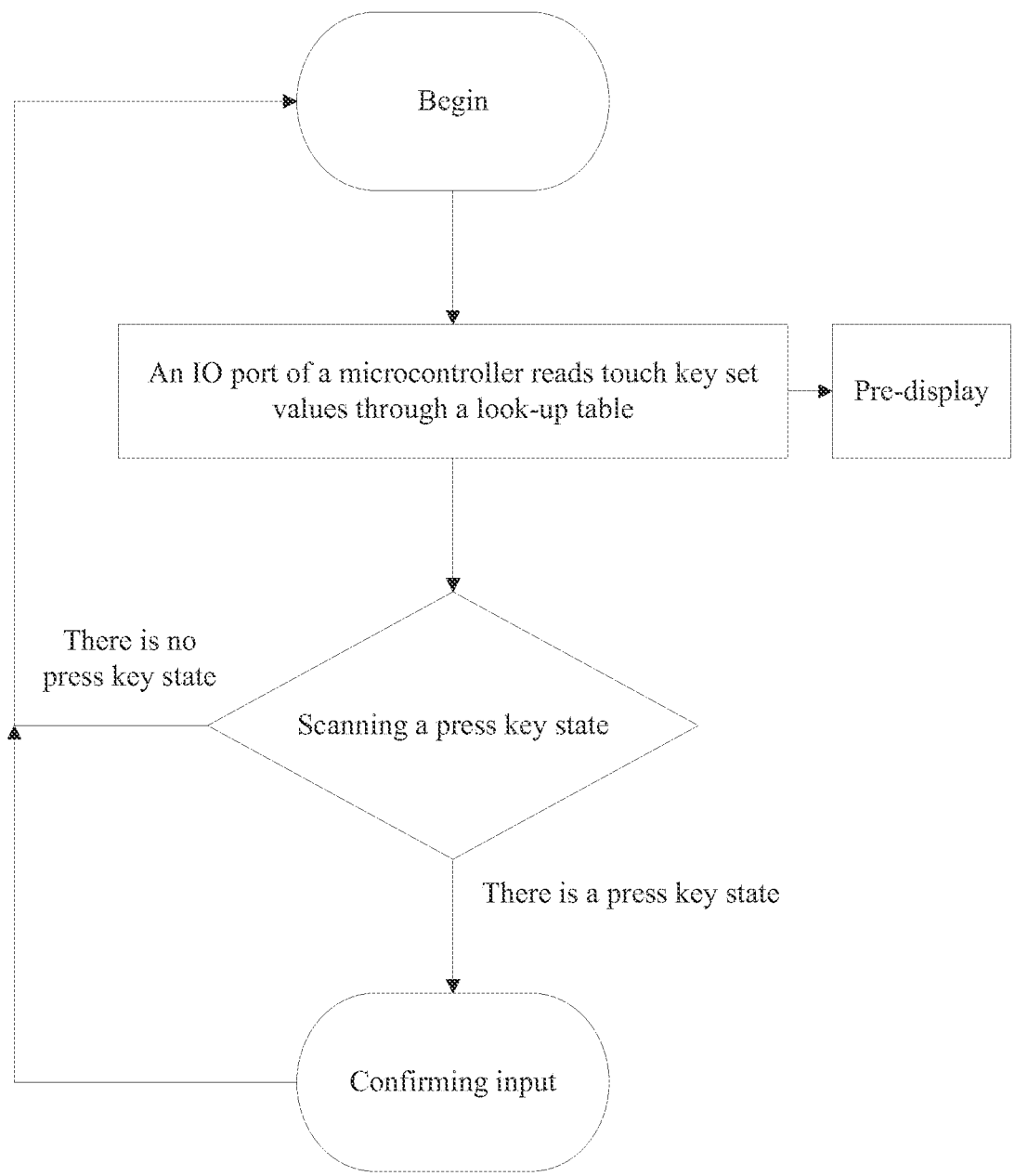
FIG. 7 illustrates a flow chart of a circuit device when a hand-held combination key apparatus shown in FIG. 1 processes a key input.

As shown in FIG. 7, in this embodiment, the method for using a hand-held combination key apparatus to input information to a corresponding intelligent electronic apparatus (in the embodiment, a hand-held combination key apparatus inputs information to a mobile phone is used as an example) has the following steps.

Step 1: when a user operates the apparatus, the middle finger 30 touches on two combination keys of the first key group; the ring finger 40 touches on two combination keys of the second key group; the pinky finger 50 touches on two combination keys of the third key group. When a finger touches the corresponding combination key, the retrieval sampling circuit 72 that is electrically connected to the keycap 31-1 of the combination key is in the corresponding conducting state. The retrieval sampling circuit 72 that is electrically connected to the untouched combination key is in the corresponding cut-off state.

Step 2: the microcontroller 71 sets the state of the combination key which is connected to the conducting retrieval sampling circuit 72 to "1" state, while the microcontroller 71 sets the state of the untouched combination key which is connected to the cut-off retrieval sampling circuit 72 to "0" state. Based on the different states of various combination keys, the microcontroller 71 identifies a corresponding set of three characters through a look-up table approach, and the three characters are pre-displayed on a pre-displayed floating window of the corresponding liquid crystal display 6.

Figures 3, 8:
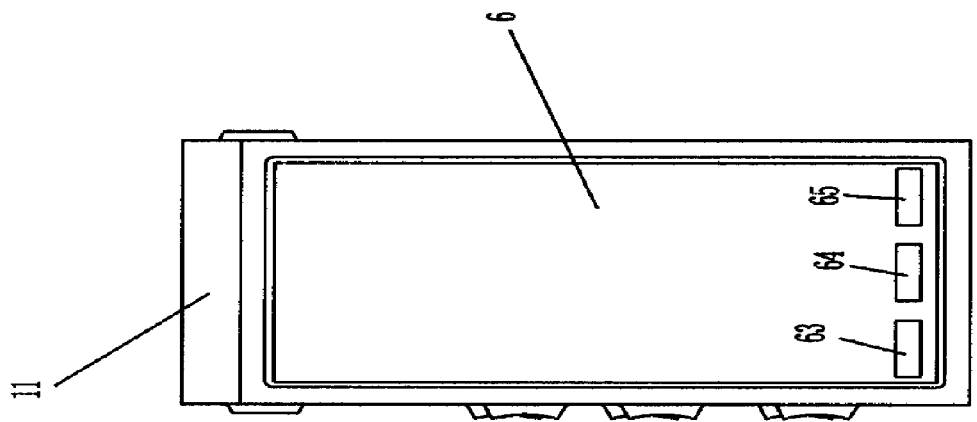
FIG. 8 illustrates a schematic diagram of a small display area located at different positions when a liquid crystal display of a hand-held combination key apparatus shown in FIG. 1 displays information, where
Figures 2, 8:
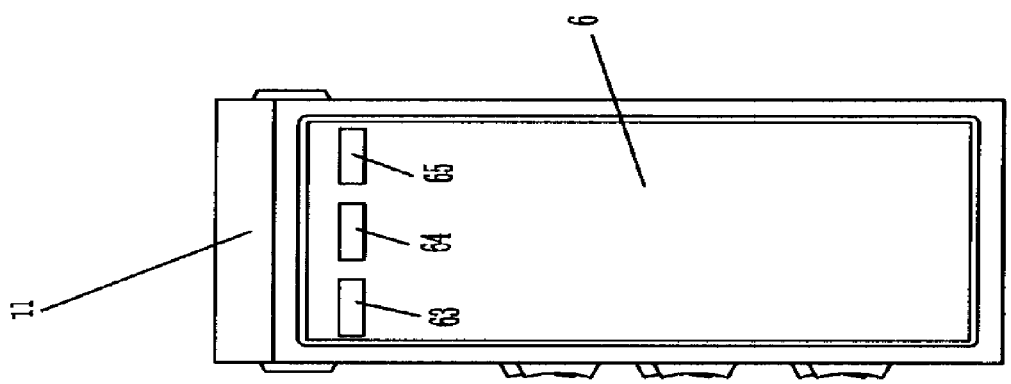
Figures 1, 8:
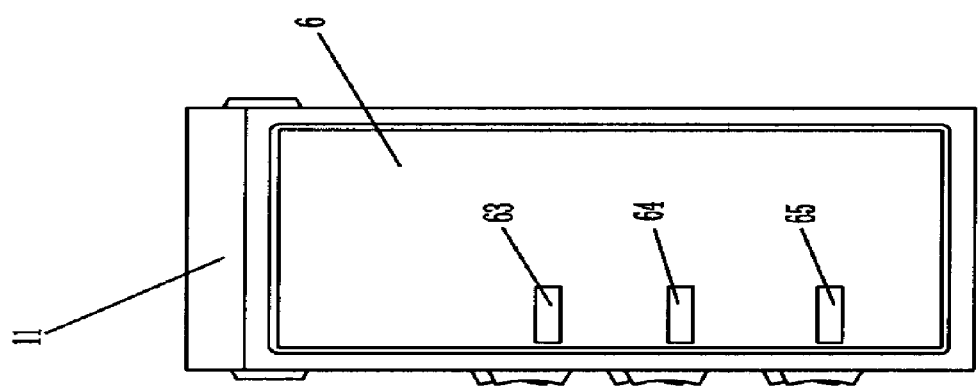

As shown in FIG. 8, in this embodiment, through the control of microcontroller 71, when using the liquid crystal display 6, three small display areas of the maskable (turn off) floating windows are set, the first small display area 63, the second small display area 64 and the third small display area 65, respectively. The maskable small display area corresponding to the first key group 3 is the first small display area 63. The maskable small display area corresponding to the second key group 4 is the second small display area 64. The maskable small display area corresponding to the third key group 5 is the third small display area 65. The three small display areas can be set on the lower side, the upper side or the left side of the screen (left side in this embodiment) according to user's preference. The three maskable (turned off) small display areas pre-display a corresponding character in a set of retrieved characters, respectively.

Step 3: when a user needs to confirm one retrieved corresponding character displayed on the small display area, the user only needs to press the corresponding key group which corresponds to the small display area to enter the character into the mobile phone.

As shown in FIG. 6, when a finger presses a corresponding 1 or 2 combination keys in the same key group, a control signal that selects the corresponding inputting pre-displayed symbols is sent to the microcontroller 71 by the control circuit 73. The microcontroller 71 performs a confirmation input processing for the selected pre-displayed corresponding character. That is, information is entered into the main chip of the mobile phone (similar to the key input method of mobile phone).

When a user uses the hand-held combination key apparatus in this embodiment, the middle finger operates two combination keys of the first key group. There are four touch states in total when the middle finger touches the first combination key 31 and the second combination key 32.

When the middle finger only touches the first combination key 31, the touch state is denoted by 10;

When the middle finger does not touch the first combination key 31 and the second combination key 32, the touch state is denoted by 00;

When the middle finger touches both the first combination key 31 and the second combination key 32 at the same time, the touch state is denoted by 11;

When the middle finger touches the second combination key 32, the touch state is denoted by 01.

It can be seen, based on touching state with the middle finger, the first key group may be in four different states 10, 00, 11, 01, respectively.

The touch states of the ring finger and the second key group, as well as the touch states of the pinky finger and the third key group are the same as the touch states of the middle finger and the first key group. That is, there are four kinds of touch states for the ring finger and the second key group, as well as the pinky finger and the third key group.

Thus, a total number of combinations of the touch states of the three fingers and the corresponding key groups is 4 to the third power in total, that is, 64 different combination states. Each specific combination state is set to correspond to three characters. That is, a character table is set in the microcontroller 71. Each specific combination state corresponds to three characters of the character table and is pre-displayed. If there is the desired character, the operator presses the combination key in a corresponding key group, and the character is confirmed. Thus, the six combination keys are operated by the three fingers. In theory, the character table may set at most 3*64=192 different kinds of characters in total.

In four kinds of states (10, 00, 11, and 01) of each key group, the touch state 00 is the state that the finger does not touch the two combination keys, the confirmation operation by pressing cannot be completed in the state 00. Because once the pressing operation is performed, the finger touches the combination keys of the key group, and the key group immediately exits 00 state. Therefore, the number of characters in the character table cannot be greater than 192. For the hand-held combination key apparatus, the maximum number of characters in the character table is 144. The reason is as follows. When the middle finger performs a pressing confirmation operation, the pressing confirmation operation can be performed only when the middle finger is in 10, 11, 01 state. However, the ring finger and the pinky finger may still be in any one of four states 10, 00, 11, 01. Thus, the states that the middle finger may complete the pressing confirmation operation of the keys are 3*4*4=48 in total. For the same reason, when the ring finger or the pinky finger performs a pressing confirmation operation, the number of states that can complete the operation is 3*4*4=48, respectively. Sum of the three cases is the 144 states. Therefore, the method can implement the operations for searching and confirming the input of 144 characters using the three fingers. The setting of this method, in addition to achieving a similar 86-keyboard input has extra 58 states that can perform any operation. It can be set that 26 states are used to enter uppercase letters, and 21 states are used to enter symbols on the top row of the number keys. The remaining 11 states are backup states and the operation functions of the remaining 11 states can be customized ion by the user.

Figure 9:
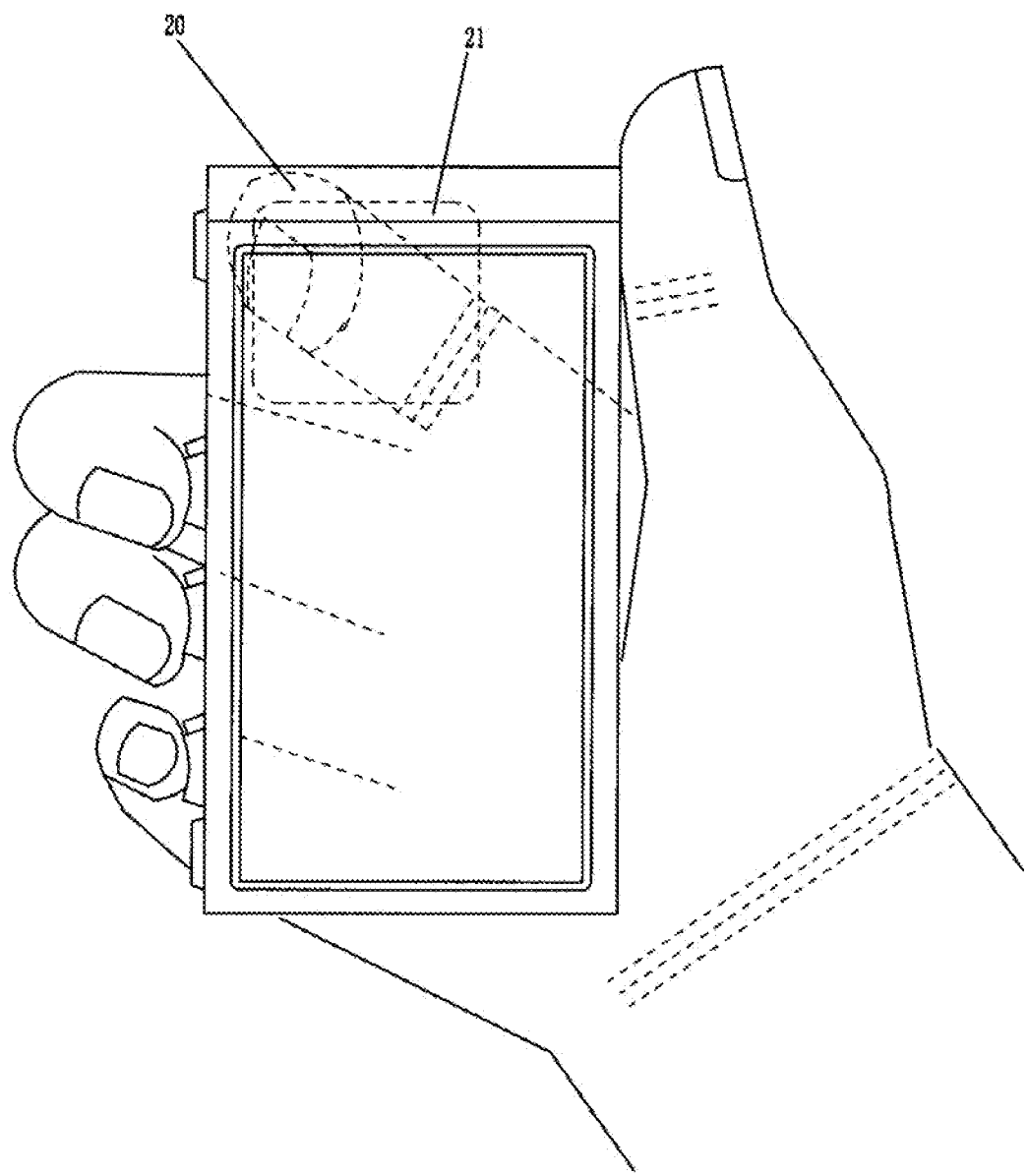
FIG. 9 illustrates a schematic diagram of a touch panel of the hand-held combination key apparatus shown in FIG. 1 operated by an index finger.

As shown in FIG. 9, the apparatus can also implement operation functions of a mouse. When a user uses the apparatus, the user holds the touch key 22 by the index finger 20 to conduct the corresponding retrieval sampling circuit 72. After the microcontroller 71 receives this signal, the apparatus enters into the character retrieval and input state. After the index finger 20 leaves the touch key 22, the apparatus exits the character retrieval and input state. When the index finger 20 leaves the touch key 22, the apparatus is in an information processing and control operation state. At this time, the first combination key 31 and the second combination key 32 can be changed to the held key of the apparatus. The microcontroller 71 does not respond to the high or low level of the retrieval sampling circuit 72. The hand can hold the apparatus by using the first combination key 31 and the second combination key 32 with thumb and thumb metacarpal. The second key group 4 and the third key group 5 can be changed into left and right keys (similar to the left button and the right button of the mouse, respectively). When the index finger moves on the touchpad 21, the movement of a cursor can be implemented. The mouse functions of the apparatus can be implemented through combining the touchpad 21, the second key group 4 and the third key group 5 using the index finger 20, the ring finger 40, and the pinky finger 50.

Embodiment Two

Figures 1, 10:
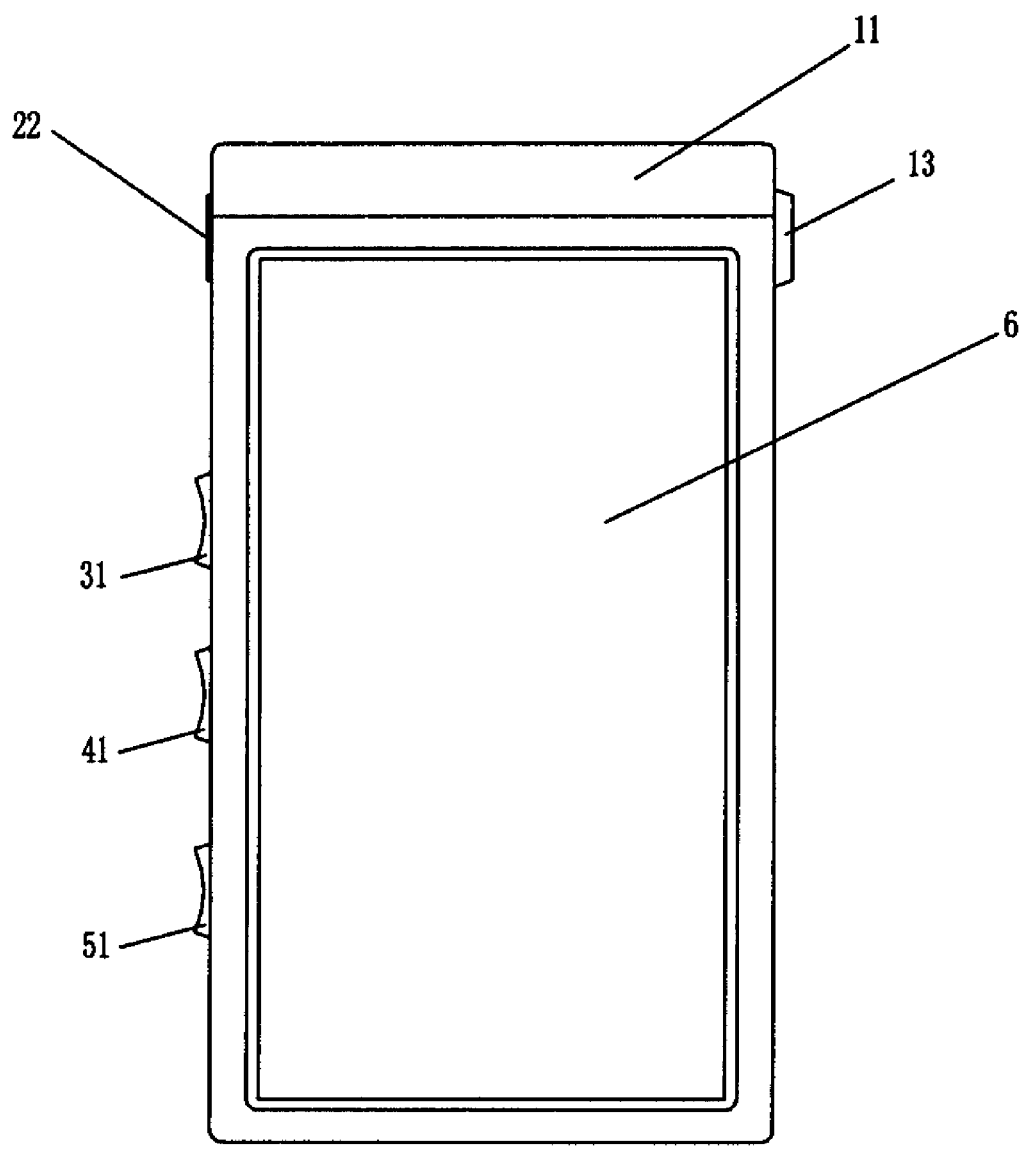
FIG. 10 illustrates a structure diagram of another exemplary hand-held combination key apparatus, where
Figures 2, 10:
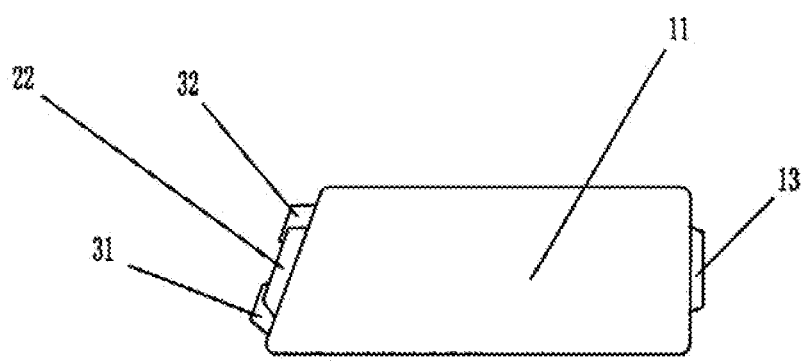

As shown in FIG. 10, the rest of the embodiment is the same as the embodiment one. The difference is that the side where the first combination key 31 and the second combination key 32 locates is almost perpendicular to the corresponding fingertip in order to avoid inadvertently touching the second combination key 32 when the middle finger touches the first combination key 31. Therefore, the angle between the front side and the left side of handheld mobile apparatuses can be designed with a positive angle of 60 degrees to 80 degrees (70 degrees in this embodiment).

Embodiment Three

The rest of the embodiment is the same as embodiment one. The difference is that the design of a left-hand handheld apparatus is implemented in this embodiment. Therefore, the corresponding parts are set right and left symmetrical positions in accordance with the parts of the embodiment one. The settings of the left side and the right side of the shell 1 are exchanged. The held portion 13 is at the left side of the shell 1. The touch key 22 is at the right side of the shell 1. The six combination keys are located on the right side of the shell 1. The touch side of the touchpad 21 exposes to the outside from the upper right of the rear side of the shell 1.

Embodiment Four

The rest of the embodiment is the same as embodiment one. The difference is that the touch key 22 is set in the operating position of the pinky finger 50, and the apparatus is held by the pinky finger 50, thumb 10 and palm. The first key group 3, the second key group 4 and the third key group 5 are set in the corresponding operating position of the index finger 20, the middle finger 30 and the ring finger 40, respectively. The corresponding index finger 20, the middle finger 30 and the ring finger 40 performs the operations.

Embodiment Five

Figure 11:
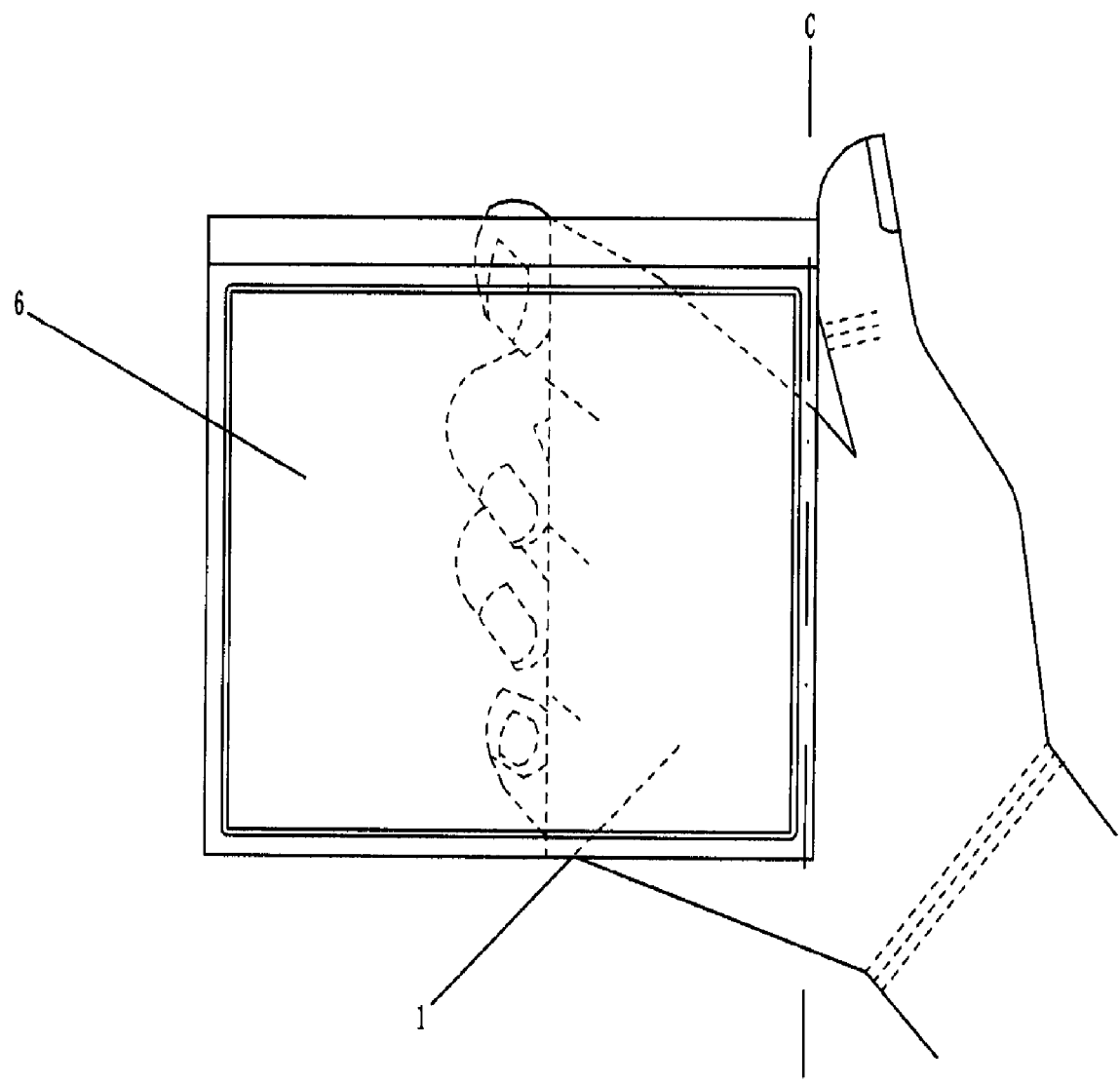
FIG. 11 illustrates a structure diagram of another exemplary hand-held combination key apparatus, where the combination key of the hand-held combination key apparatus locates at rear side of a liquid crystal display; and the liquid crystal display is a widescreen LCD monitor.

As shown in FIG. 11, the rest of the embodiment is the same as the embodiment one. The difference is that, in this embodiment, the liquid crystal display 6 is pivotally connected with the shell 1 and electrically connected with the corresponding circuit device 7. When a user holds the shell 1, the screen of the liquid crystal display 6 may rotate along the longitudinal direction of axis C shown in FIG. 11. Therefore, the liquid crystal display 6 can be made larger, more convenient for the user to view the display content.

Embodiment Six

Referring to FIG. 1 to FIG. 7, the rest of this embodiment is the same as the embodiment one. The difference is that the liquid crystal display 6 is not included in the present embodiment, or the liquid crystal display 6 is in a disable state. The intelligent electronic apparatus corresponding to this apparatus is a computer (desktop or laptop). The microcontroller 71 of this apparatus creates a bidirectional connection to computer's main chip through a wireless or wired way.

In this embodiment, when the hand-held combination key apparatus inputs information to the computer, in Step 2, based on the different states of various combination keys, after the microcontroller 71 identifies a corresponding set of three characters through a look-up table approach, the microcontroller 71 creates a bidirectional connection to computer's main chip. The computer's main chip opens up corresponding pre-display windows which can be open or close to pre-display the three characters of one set. In Step 3, when a user presses the corresponding key group that corresponds to the small display area, the microcontroller 71 sends the confirmation information to the computer's main chip. Then, the main chip confirms information input.

In addition, the apparatus can also be used as an input apparatus for various remote controls, such as a TV remote control, a set-top box remote control, remote controls of other smart home appliances, as well as remote controls of a variety of industrial intelligent electronic apparatuses.

Embodiment Seven

The rest of the embodiment is the same as embodiment one. The difference is that a thumb pick is set and the apparatus is fixed in a hand by the thumb pick. Then, the touch key 22 is replaced with a combination key, while a corresponding small display area is added, greatly expanding input capabilities of this apparatus.

Embodiment Eight

The rest of the embodiment is the same as embodiment one. The difference is that the apparatus has a resilient mounting sleeve disposed in the shell 1, and resilient mounting sleeve is configured to set the apparatus in the palm. When the apparatus is held on the palm, the portion of the shell 1 contact with palm root is the held portion, and the held portion is a conductive portion.

The number of the retrieval sampling circuit 72 of the circuit device 7 is 10. The number of control circuit 73 of the circuit device 7 is 5. Each retrieval sampling circuit 72 of the circuit device 7 has the same circuit structure. Each control circuit 73 of the circuit device 7 has the same circuit structure.

The number of combination key groups is five, and each key group has two combination keys. 10 combination keys of 5 combination key groups have the same circuit structure. 4 key groups located at the left side of the shell 1 in accordance with the order from top to bottom are the first key group, the second key group, the third key group and the fourth key group, respectively. The 4 key groups correspond to the index finger, the middle finger, the ring finger and the pinky finger, respectively. The first key group includes a first combination key and a second combination key arranged in order. The second key group 4 includes a third combination key and a fourth combination key arranged in order. The third key group includes a fifth combination key and a sixth combination key arranged in order. The fourth key group includes a seventh combination key and an eighth combination key arranged in order. The key group located in the upper right side of the shell 1 is the fifth key group. The fifth key group corresponds to the thumb. The fifth key group includes a ninth combination key and an tenth combination key arranged in order.

The corresponding display apparatus has five pre-display floating small areas.

INDUSTRIAL APPLICABILITY

The present invention has advantageous effects: (1) A hand-held combination key apparatus provides for a corresponding intelligent electronic apparatus with such a function: a user can pre-display and then confirm information through operating the hand-held combination key apparatus, and can achieve up to 144 kinds of different configurations by using three fingers to touch and press three groups' of combination keys. The input operation implements a similar to computer keyboard input operation through the handheld operation by using single hand, therefore bringing a radical change in the computer information input, mobile phone operations, and other remote operation areas. First, the input apparatus no longer needs to occupy the desktop space. Second, the user is freed from the status of sitting down to input information. Instead, the user can input information when the user is sitting, standing, lying down and moving, as well as on the road. Third, the control of home appliances and various industrial intelligent apparatuses can be more user-friendly, and control commands are issued more conveniently through humanized operations on corresponding remote controls. (2) The combination key of the hand-held combination key apparatus of the present invention has a touch preselect function, and can pre-display search results on the small display area of a corresponding display terminal. Then the user can press the corresponding combination key to confirm the input, greatly improving efficiency and quality of inputting information. (3) When hand-held combination key apparatus of the present invention used in handheld mobile apparatuses, since the keyboard is set on the side of the handheld mobile apparatus, the keyboard does not affect the screen display, effectively eliminating the display interference caused by using the touch screen to input text information. (4) By using the three groups of combination keys (total six keys) of hand-held combination key apparatus, up to 144 kinds of character selection and confirmation can be completed, meeting the basic needs of the character input speed and accuracy. If four groups of combination keys (total eight keys) are utilized, selection and confirmation for up to 768 kinds of characters can be completed, greatly meeting input requirements. If five groups of combination keys (total ten keys) are utilized, selection and confirmation for up to 3840 kinds of characters can be completed. (5) The hand-held combination key apparatus can be used in any state without limitation absolutely, such as when the user is sitting, standing, lying down and moving, other than the normal standard keyboard which needs a practicable plane to support in use, saving space. (6) The present invention can be used for designing 3G mobile phones. Since the keyboard does not need to be set on the front of the apparatus, a large LCD display can be set on the front of the mobile phones. An image window can be created on the top of the LCD display through a software system, and additional 2 to 3 small windows can be created at the bottom of the LCD display, which are used for managing text chat, document input and other operations, respectively. The display of the input apparatus is not affected when information is inputted. (7) Through the combination keys and a touchpad, the user can input information and control operations for hand-held mobile apparatuses. In addition, when the user gets familiar to the operations of the combination keys, such as touch for searching and press for confirmation keys, the user can turn off these small display areas, thereby increasing display area of the apparatuses. (8) This apparatus can be made into a right-hand apparatus and a left-hand handheld apparatus, similar to the switch function of the left and right button of a mouse, greatly increasing the scope of the users.

What is claimed is:

1. A hand-held combination key apparatus for inputting and controlling information, comprising:
   a shell designed to a shape that is held conveniently by a hand as the hand-held mobile apparatus based on human engineering and operating requirements;
   three key groups set on one side of the shell, wherein each key group has two combination keys, and each combination key is configured to simultaneously support two input mechanisms including a touch input and a press input, and each key group corresponds to one finger;
   wherein:
   each combination key is electrically connected to a touch detection circuit and a press detection circuit respectively;
   when the combination key is touched, the touch detection circuit sets a state of the touched combination key to "1" state;
   when the combination key is not touched, a state of the untouched combination key is set to "0" state, such that each key group has four possible states, including a "00" state, a "01" state, a "11" state, and a "10" state; and
   press detection of a combination key is similar to a key of a computer keyboard.

2. The apparatus according to claim 1, wherein:
   each key group is associated with a small display area on a corresponding position of a display screen.

3. The apparatus according to claim 1, wherein:
   a touch key corresponding to an index finger is configured on a same side of the shell as the three key groups; and
   when a user is holding the apparatus and touching the touch key with the index finger, the apparatus enters into an information input state.

4. The apparatus according to claim 3, wherein the information input includes:
   retrieving and pre-displaying information in the small display areas corresponding to the three key groups; and
   pressing one combination key from one of the three key groups to confirm the information input.

5. The apparatus according to claim 4, wherein:
based on different touch states of all combination keys, a corresponding set of three characters is identified and displayed on the three small display areas respectively;
pressing the combination key from one key group confirms inputting one of the three characters displayed on the small display area corresponding to the key group; and
the different touch states of all combination keys include at most 64 combinations and correspond to at most 192 characters.

6. The apparatus according to claim 4, wherein:
the touch states of the combination keys are used to search and pre-display characters and operational symbols; and
pressing one combination key is used to confirm to input one of the pre-displayed characters and the pre-displayed operational symbols.

7. The apparatus according to claim 6, wherein the circuit device includes:
a printed-circuit board;
a microcontroller configured to create a bidirectional connection to a main chip of an intelligent electronic apparatus;
ten retrieval sampling circuits;
five control circuits; and
a DC power supply.

8. The apparatus according to claim 7, wherein:
all retrieval sampling circuits have same circuit structure, including one of a capacitive detection circuit and a resistance-type detection circuit;
when the retrieval sampling circuit is a resistance-type detection circuit, the retrieval sampling circuit uses one of an inverter and an op-amp as a main circuit;
one of positive and negative poles of the power supply of the printed-circuit board is used as a ground and is electrically connected to a held portion; and
output ports of all retrieval sampling circuits are connected to one I/O port of the microcontroller.

9. The apparatus according to claim 7, wherein:
each control circuit has the same circuit structure;
each key group corresponds to one control circuit; and
each control circuit is one OR gate constituted by parallel push switches of two combination keys of the same key group.

10. The apparatus according to claim 9, wherein:
two inputs of the OR gate are electrically connected to a ground of the power supply of the printed-circuit board; and
an output of the OR gate connects to one corresponding I/O port of the microcontroller.

11. The apparatus according to claim 6, wherein:
the front cover and the rear cover are insulation injection molding;
the front cover is an injection molding with a conductive frustum-shaped insert;
the front cover is formed by a front frame plate and 4 side plates, including an upper side plate, a left side plate, a lower side plate and a right-side plate, wherein the 4 side plates are connected to the front frame plate, and the 4 side plates are also connected to each other in order;
the conductive frustum-shaped insert as the held portion of the shell locates on an upper part of the right-side plate of the front cover and protrudes to the right side;
a through-hole of the touch keycap is set on the upper part of the left side plate of the front cover, opposing to the location of the held portion;
from the top to the bottom, 3 groups of keyholes are set in the middle part of the left side plate of the front cover;
each group has two keyholes set up in the order of front and rear, and the shape of each keyhole is rectangular;
in each group of keyholes, the keyhole at the rear side is slightly higher than the keyhole at the front side;
the shape of each keycap is small-left and right-large bevel shape; and
each combination key exposes to the left of the shell from a corresponding keyhole of the front cover of the shell by the each keycap.

12. The apparatus according to claim 6, wherein:
the keycap of each combination key, the elastic insulator, and the movable stationary contact component are arranged from left to right;
the movable stationary contact component is a conductive plate;
the stationary contact as a copper insert is the first electrode and the second electrode fixed on the insulation mounting base;
the conductive plate as the movable contact along with a first electrode and a second electrode as the stationary contact form a corresponding touch key;
the insulation mounting base is fixed on the front cover of the shell; and
a compression spring as an elastic strutting piece is set between the conductive plate and the left side of the inner cavity of the insulation mounting base.

13. The apparatus according to claim 3, wherein the touch key includes:
a conductive touch keycap designed to a frustum-shaped projection, wherein the conductive touch keycap is electrically connected to a control port of the corresponding retrieval sampling circuit;
an insulation mounting base set to the upper part of the left side plate of the front cover of the shell, wherein the insulation mounting base is fixed to the inner wall of the front cover of the shell; and
a lead, wherein one end of the lead is fixed by welding on the touch keycap, and the other end of the lead is electrically connected to a control port of the corresponding retrieval sampling circuit.

14. The apparatus according to claim 13, wherein:
the conductive touch keycap is fixed on the insulation mounting base; and
the conductive touch keycap passes through the shell from the circular touch keycap through-hole located on the upper part of the left side plate of the front cover and protrudes to the left side.

15. The apparatus according to claim 1, wherein the three key groups include:
a first key group corresponding to a middle finger and having a first combination key and a second combination key arranged in order;
a second key group corresponding to a ring finger and having a third combination key and a fourth combination key arranged in order; and
a third key group corresponding to a little finger and having a fifth combination key and a sixth combination key arranged in order.

16. The apparatus according to claim 5, wherein:
when the touch key for the index finger is untouched, the apparatus exits the information input state;
the first combination key and the second combination key are changed into the held key of the apparatus;
when moving on a touchpad, a cursor of the display screen is moved; and
when the apparatus is held in a palm of one hand, the second key group and the third key group are changed into a left keystroke and a right keystroke, which are similar to the left button and the right button of a mouse, respectively.

17. The apparatus according to claim 16, wherein:
the touchpad is set on the rear cover of the shell;
the rear cover of the shell is a cover that has a touchpad hole at the upper left part; and
the touch side of the touchpad is exposed outwardly from the left upper part of the rear cover of the shell.

18. The apparatus according to claim 1, wherein:
the shell is formed by fixedly connecting a front cover with a rear cover; and
a holding portion which protrudes to the right side and conducts electricity is set on the upper right side of the shell.

19. The apparatus according to claim 18, wherein:
when the keycap is pressed, the movable contact and the stationary contact of the combination key contact with each other, turning on the corresponding push switch and the OR gate of the corresponding control circuit, thus outputting a low level to the microcontroller as a confirmation signal; and
when information is inputted to the intelligent electronic apparatus, the microcontroller creates a bidirectional connection to the main chip through any one of a wireless way, a wired way and a direct connection way.

20. The apparatus according to claim 1, wherein: each combination key includes:
a conductive keycap configured to be electrically connected to a control port of the touch detection circuit via a lead, wherein the touch detection circuit is a retrieval sampling circuit,
an elastic insulator, and
a movable stationary contact component including a movable contact and a stationary contact, wherein the movable contact and the stationary contact form the press detection circuit,
wherein:
the elastic insulator is configured as an insulating spacer between the conductive keycap and the movable contact of the movable stationary contact component.

21. A method for inputting and controlling information using a hand-held combination key apparatus, comprising:
holding a touch key to conduct a corresponding retrieval sampling circuit;
creating, by a microcontroller, a bidirectional connection to a main chip of an intelligent electronic apparatus;
pre-displaying three characters on a small display area on a corresponding position of a display screen;
confirming a pre-displayed corresponding character; and
inputting the character into a corresponding intelligent electronic apparatus,
wherein the hand-held combination key apparatus comprises:
a shell designed to a shape that is held conveniently by a hand as the hand-held mobile apparatus based on human engineering and operating requirements;
three key groups set on one side of the shell, wherein each key group has two combination keys, and each combination key is configured to simultaneously support two input mechanisms including a touch input and a press input, and each key group corresponds to one finger;
wherein:
each combination key is electrically connected to a touch detection circuit and a press detection circuit respectively;
when the combination key is touched, the touch detection circuit sets a state of the touched combination key to "1" state;
when the combination key is not touched, a state of the untouched combination key is set to "0" state, such that each key group has four possible states, including a "00" state, a "01" state, a "11" state, and a "10" state; and
press detection of a combination key is similar to a key of a computer keyboard.

* * * * *